United States Patent Office 3,461,933
Patented Aug. 19, 1969

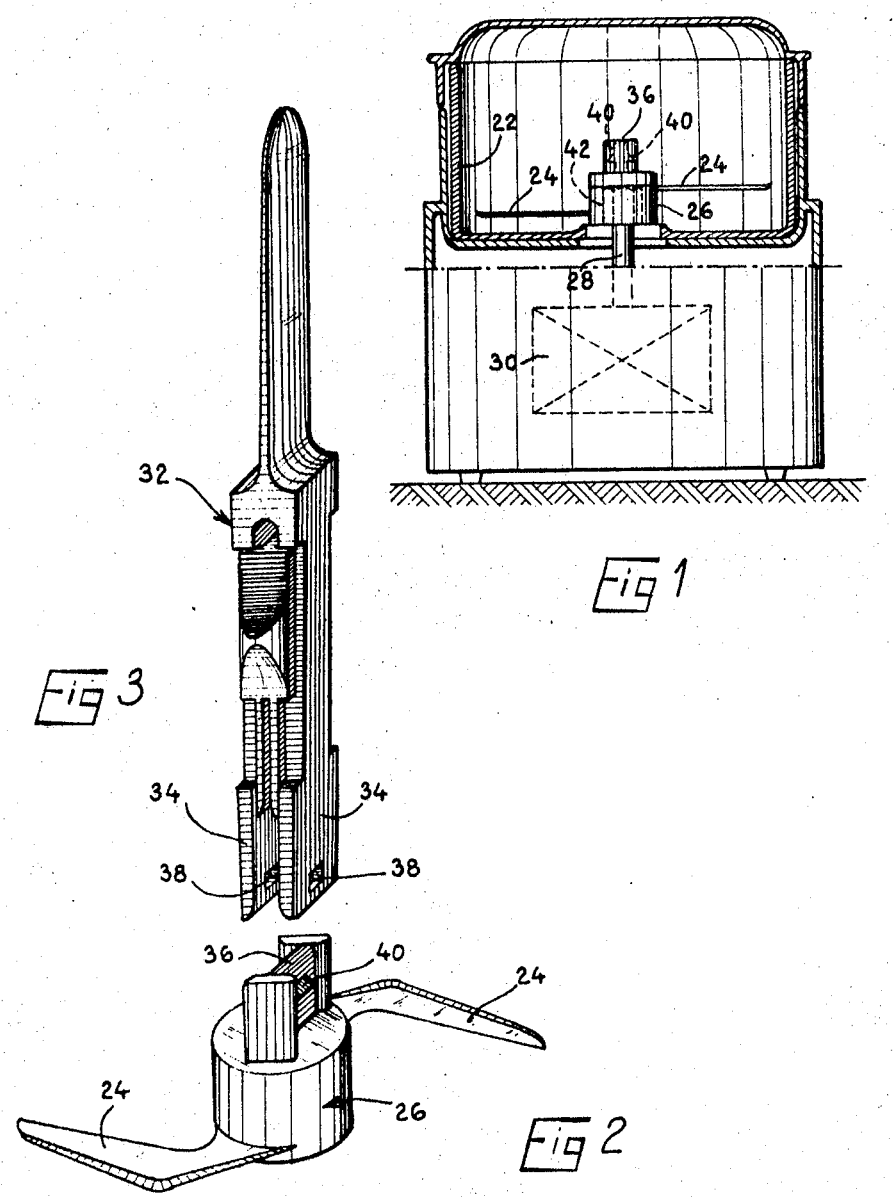

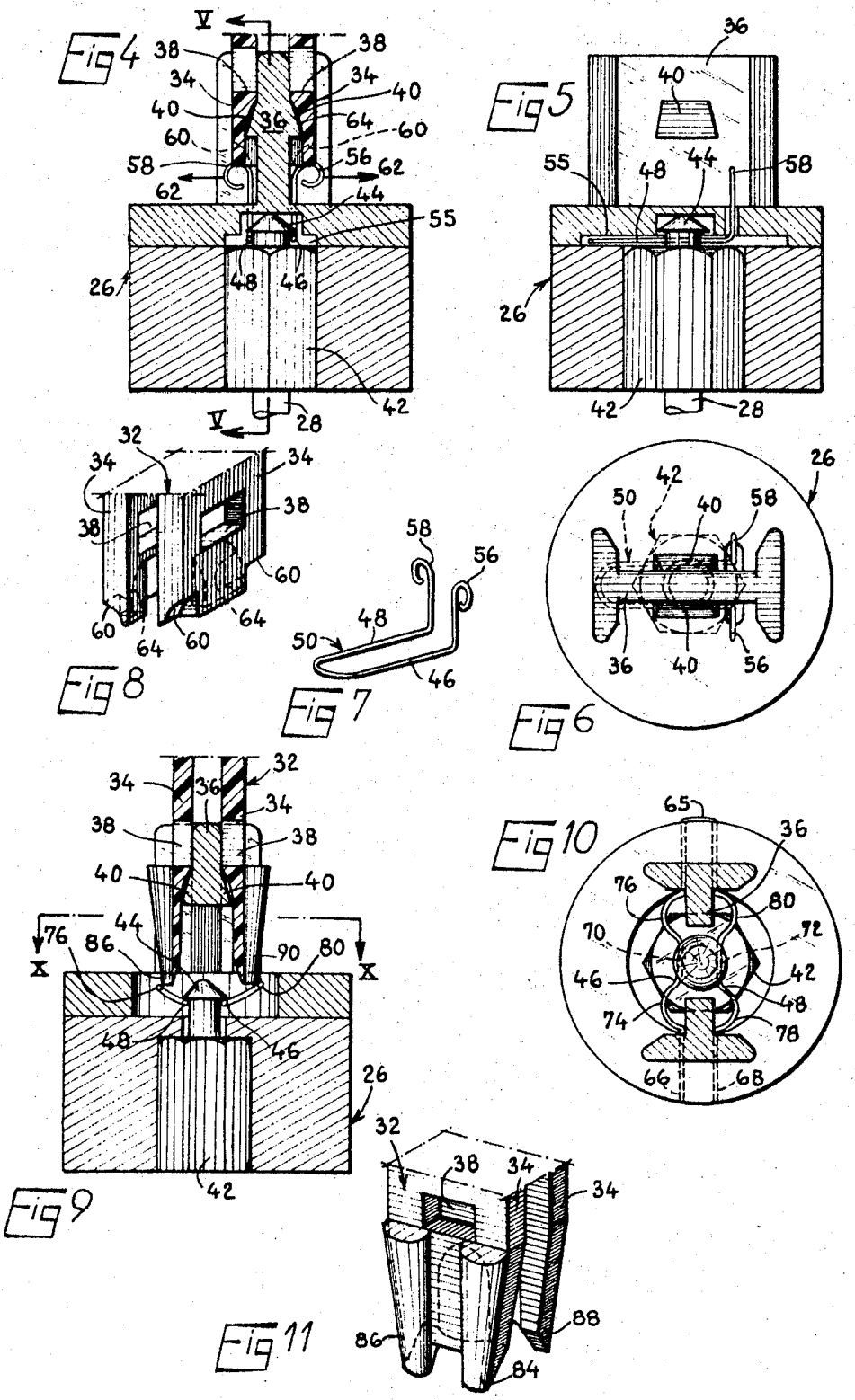

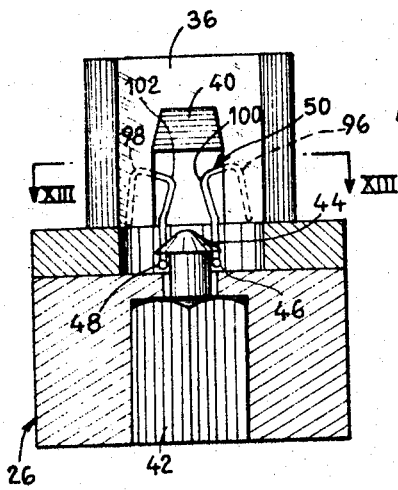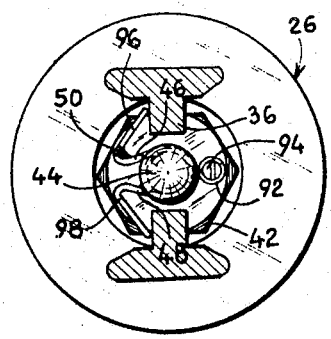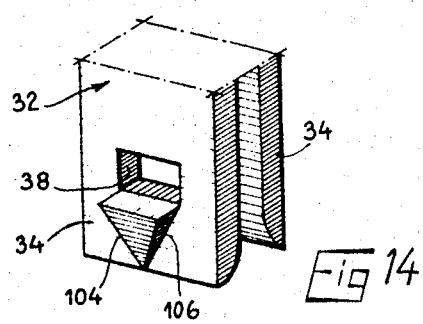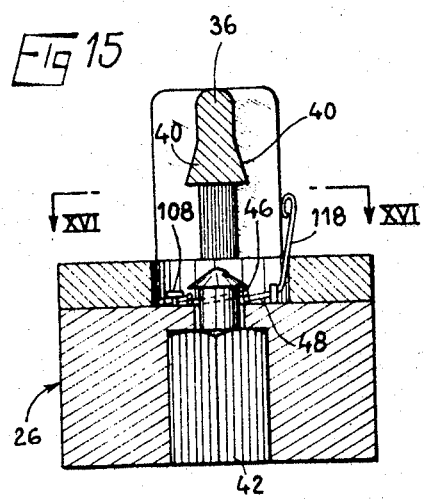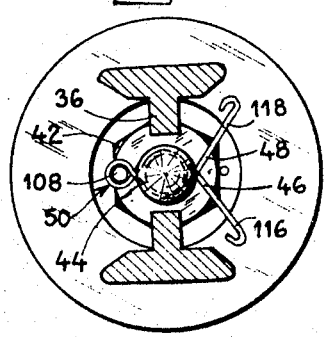

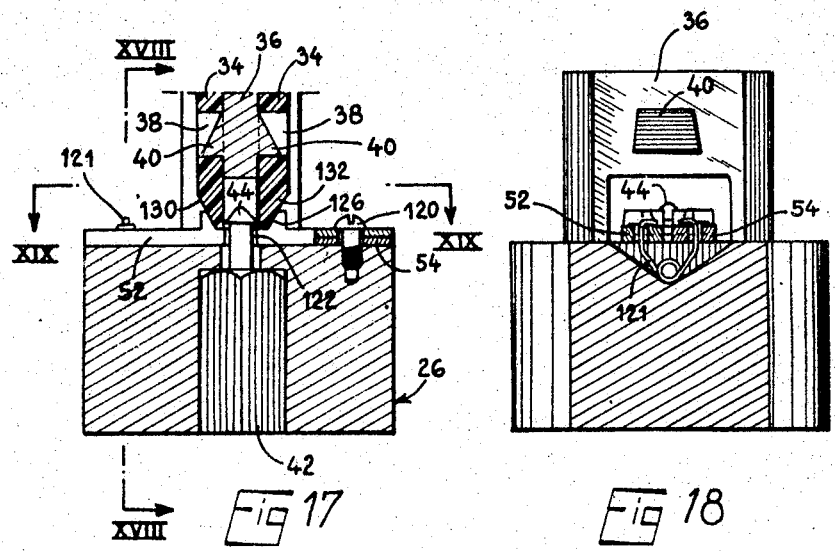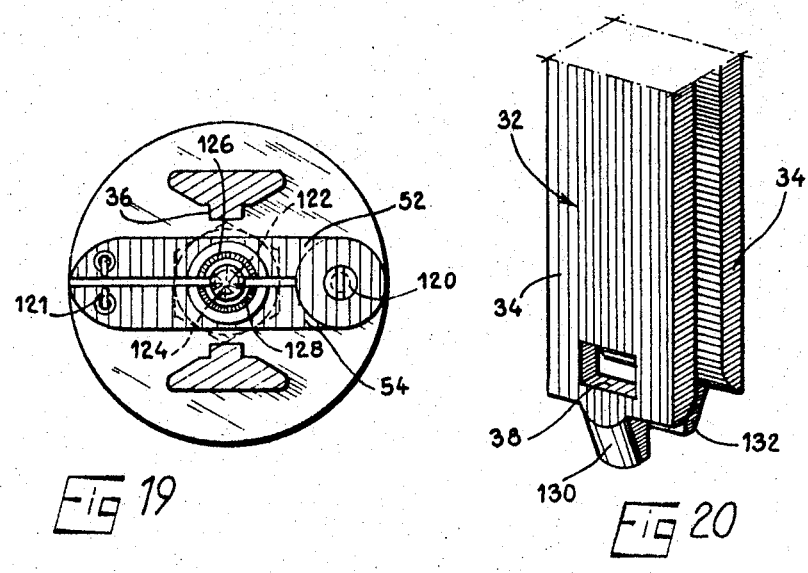

3,461,933
ROTARY BLADE DOMESTIC APPLIANCE
Jean Mantelet, Paris, France, assignor to Moulinex,
Societe Anonyme, Bagnolet, France
Filed Feb. 6, 1967, Ser. No. 614,161
Claims priority, application France, Feb. 15, 1966,
49,676
Int. Cl. B02c 2/04
U.S. Cl. 146—68                                   2 Claims

ABSTRACT OF THE DISCLOSURE

An electric domestic appliance such as a mincer or shredder has a working bowl mounted above a motor assembly housing, a spindle driven by the motor extending into the bowl and a rotary blade socket is demountably secured to the spindle, to rotate therewith, by a locking device resiliently urged into its locking position.

CROSS-REFERENCES TO RELATED APPLICATIONS

French application No. 49,676 dated Feb. 15, 1966.
French Patent No. 1,448,886.

BACKGROUND OF THE INVENTION

Field of the invention

The invention relates to domestic electrical appliances such as, for example, mincers, grinders, mixers, comprising a working bowl in which revolve one or more blades fast with an element such as a sleeve or socket removably mounted on a spindle driven by a motor assembly.

Description of the piror art

In such known appliances the blade-bearer sleeve or socket is most frequently mounted on the spindle by clamping it between a shoulder or step on the spindle and a nut screwed on an end portion of the spindle and over which the sleeve or socket is threaded.

SUMMARY

The main object of the invention is to provide such an appliance with an improved means of mounting the blade-bearer socket on the spindle without any screwing action.

According to the present invention and electric domestic appliance comprises a working bowl, in one or more blades fast with a socket demountably secured to a spindle driven by a motor assembly, and a locking device resiliently urged towards its locking position to secure the socket on the spindle.

The user may thus fit the blade-bearer socket on the spindle by a simple movement.

The locking device is preferably carried by the socket and is urged elastically into a seat on the lateral surface of the spindle.

In case one wishes to ensure that the blade-bearer socket cannot slip off the spindle by itself during operation, the inner face of the seat against which the locking device comes into abutment in the direction of release of the socket, has a sudden change in outline transversely to the axis for example, and the locking device then comprises actuating means which are operated to release it from its seat.

The locking device may comprise two jaws arranged in opposition at either side of the spindle and engaging under the head of an end portion of mushroom shape borne by the extremity of this spindle.

In one construction two jaws may be formed by the two symmetrical limb portions of a bent component of flexible wire, having extensions which form operating handles on which one may act to cause the said limb portions to spread apart, thus causing unlocking.

If the appliance has a clamping handle or the like, such as that described in the French Patent No. 1,448,886 for handling the blade-bearer socket and which comprises two opposed jaws arranged for clamping over an extension of the said socket, this clamping handle may comprise ramp surface adapted to co-operate, respectively, with the operating handles of the jaws of the socket locking device to cause these jaws to be spread apart during the displacement causing the clamping jaws to engage on the extension.

The clamping handle thus represents a key by means of which release is performed automatically as soon as the user engages the clamping handle on the socket to remove this socket from the appliance for cleaning or for removing the crushed or minced substances from the working bowl.

BRIEF DESCRIPTION OF THE DRAWINGS

FIG. 1 is a vertical cross section through a mincer or shredder comprising rotary blades;

FIG. 2 shows on an enlarged scale the blade-bearer socket of the mincer or shredder of FIG. 1;

FIG. 3 shows a clamping handle for handling the blade-bearer socket of FIGS. 1 and 2;

FIG. 4 is a vertical cross section through the blade-bearer socket with a locking device, the blade (as in the following figures) being omitted for clarity;

FIG. 5 is a partial vertical cross section along the line V—V of FIG. 4;

FIG. 6 is a plan view of the socket of FIGS. 4 and 5;

FIG. 7 is a perspective view of the locking device of FIGS. 4 to 6;

FIG. 8 is a perspective view of the extremities of a clamping handle co-operating with the sleeve or socket of FIGS. 4 to 6;

FIG. 9 is a vertical cross section through the socket having another construction of locking device;

FIG. 10 is a horizontal cross section through the socket along the line X—X of FIG. 9;

FIG. 11 is a perspective view of the extremities of a clamping handle co-ordinated with the socket of FIGS. 9 and 10;

FIG. 12 is a vertical cross section through a socket having a third form of locking device;

FIG. 13 is a horizontal cross section through the socket taken along the line XIII—XIII of FIG. 12;

FIG. 14 is a perspective view of the extremities of a clamping handle (or handling clamp) co-ordinated with the socket of FIGS. 12 and 13;

FIG. 15 is a vertical cross section through a socket having a fourth form of locking device;

FIG. 16 is a horizontal cross section through the socket taken along the line XVI—XVI of FIG. 15;

3

FIG. 17 is a vertical cross section through a socket having a fifth form of locking device;

FIG. 18 is a vertical cross section through the socket taken along the line XVIII—XVIII of FIG. 17;

FIG. 19 is a horizontal cross section of the socket of FIGS. 17 and 18; and,

FIG. 20 is a perspective view of the extremities of a handling clamp co-ordinated with the socket of FIGS. 17 to 19.

DESCRIPTION OF PREFERRED EMBODIMENTS

In the drawings, the invention is applied to a mincer or shredder such as that of FIG. 1, comprising a working bowl 22 in which revolve blades 24 fast with a socket 26 removably mounted on a spindle 28 driven by a motor assembly 30.

This shredder has a clamp or clamping handle 32 (FIG. 3) and is used for handling a blade-bearer socket or cap 26 and to this end comprises two elastic opposed jaws 34 which clamp on to an extension 36 of the socket 26 and come into engagement therewith by the engagement of two holes 38 of the jaws on two lateral projections 40 on the extension 36.

During the operation of the shredder, the socket 26 is threaded over a driving element 42 fast with the spindle 28 and is held in this position by an elastic locking device carried by this socket. This locking device comprises two opposed jaws arranged at either side of the spindle and engaged under the head of a mushroom shaped end portion 44 of the extremity of this spindle (e.g. FIG. 4). The head of this end portion has a frusto-conical impact surface on which the jaws may slide, which enables the user to fit the socket 26 by a simple movement, with automatic engagement of the jaws under the head of the end portion.

The two jaws of the locking device may assume different shapes. In the first four forms shown respectively, in FIGS. 4 to 8, 9 to 11, 12 to 14, and 15 and 16, these jaws are formed by the two symmetrical limb portions 46 and 48 of a single element 50 of elastic or resilient wire, whereas in the fifth form in FIGS. 17 to 20, they are formed by two small separate plates, 52 and 54.

In FIGS. 4 to 8, the wire component 50 forming the elastic locking device, has the form of a hairpin enclosed within a cavity 55 within the socket. The two symmetrical limbs 46 and 48 of this pin have upwardly bent over extensions 56 and 58 extending out of the cavity 55. These extensions 56 and 58 are disposed on either side of the extension 36 of the socket and are outwardly bent over to form operating handles on which one may act to cause the limbs 46 and 48 to be spread apart, thus causing release. In FIGS. 4 to 8 this operation of the handles or keys 56 and 58 occurs automatically during the engagement of the jaws 34 of the clamp 32 on the extension 36 of the socket. To this end, the jaws 34 have external ramp surfaces 60 arranged to slide on the handles or keys 56 and 58 to cause these keys to be opened; FIG. 4 shows the extremity of the clamp prior to engagement of the holes 38 of the jaws over the projections 40 of the extension: if the downward displacement of the clamp is continued, the ramp surfaces 60 come into contact with the keys 56 and 58 and cause the latter to spread apart in the direction of the arrows 62. After engagement of the holes 38 over the projections 40, the keys as well as the limb portions 46 and 48 remain open, so that the socket 26 may be withdrawn from the appliance by simply pulling the clamp upwards. It will be noted that the jaws 34 of the clamp moreover have inner ramp surfaces 64 which facilitate the motion of engagement of the jaws 34 over the projections 40 of the extension 36.

FIGS. 9 to 11, the wire component forming the locking device still has the general shape of a hairpin whose bent portion 65 as well as the extremities 66 and 68 are enclosed or held fast in the socket 26. The free median

4 parts of the limb portions 46 and 48 of this clip have a serpentine or wavy form, and their central portions 70 and 72 form the active parts of the jaws of the locking device, whereas the bent-over intermediary portions 74, 76, 78, 80 form two pairs of operating keys of the locking device. As in FIGS. 4 to 8, the actuation of these keys in the direction of release occurs automatically during the engagement of the jaws 34 of the clamp over the extension 36 of the socket. To this end, these jaws 34 have four fingers 84, 86, 88, 90 of downwardly convergent outline, adapted for engagement, respectively, between the keys 74, 76, 78, 80 to cause the limb portions 46 and 48 to be spread open during the movement engaging the clamp on the extension 36. FIG. 9 shows the extremity of the clamp prior to engagement of the holes 38 of the jaws over the projections 40 of the extension 36.

In FIGS. 12 to 14, the bent over wire component 50 forming the locking device has a more complex shape. Its bend 92 or loop, is secured to the socket by a screw 94, which it encircles. The limb portions 46 and 48 have extension 96 and 98, first bending upwards then downwards, both extending at the same side of the extension 36. The rising portions 100 and 102 of these extensions form operating keys on which are adapted to act, respectively, two sloping ramp surfaces 104 and 106 formed on one of the jaws of the clamp 32.

In FIGS. 15 and 16, the wire component 50 secured to the socket by a stud or peg 108, has a bend or loop of the same shape as that of FIGS. 12 and 13, but the extensions 116 and 118 of its limb portions 46 and 48 are crossed, so that these limb portions are spread apart by bringing these extensions 116 and 118 closer to each other. These extension thus again form operating keys, the actuation of which may, as in the preceding cases, be automatically performed during the engagement of the clamp 32 on the extension 36: this clamp 32 (not illustrated) will then have to comprise two downwardly divergent ramp surfaces on one of its jaws, arranged to act, respectively, on the keys 116 and 118 to bring these closer to each other during engagement of the clamp on the extension 36. Moreover the keys 116 and 118 may be brought closer to each other directly by hand by the user, for which the keys 116 and 118 may be a little longer than shown, to facilitate this direct action by the user.

In FIGS. 17 to 20, the jaws of the locking device are formed by two small symmetrical plates 52 and 54 hinged at one of their extremities on the socket at 120, whereas their other extremities are connected by a spring 121 which urges them towards each other. In their median portions, these small plates 52 and 54 have opposed semi-circular notches 122 and 124 which engage under the head of the end portion 44. Around these notches are frusto-conical bearing surfaces 126 and 128 forming operating keys for the locking device, and on which act fingers 130 and 132 carried by the clamp 32. FIG. 17 shows the release position in which the holes 38 of the jaws 34 of the clamp are engaged over the projections 40 of the extension 36, whereas the fingers 130 and 132 hold the small plates 52 and 54 spread apart in their unlocked position.

The six-faced driving element 42 shown may be replaced by a driving element having helical ramp surfaces such as that described in the French specification No. 1,444,849, in which the helical ramp surfaces of the driving element are normally sufficient to prevent the blade-bearer socket from slipping off the driving spindle during the operation of the appliances. In certain cases however, it may be advantageous to enhance safety by a locking device such as described hereinabove, for example by means of the device in FIGS. 4 to 8 which is of particularly simple and economical construction.

I claim:

1. An electrical domestic appliance comprising a working bowl in which revolves at least one blade fast with a socket demountably secured to a spindle driven by a motor assembly, a locking device carried by said socket and having two opposed locking jaws disposed in a plane transverse to the spindle axis at either side of said spindle and resiliently urged towards each other into a seat on the lateral surface of said spindle to secure the socket on the spindle, each locking jaw having a key operable to disengage this locking jaw from said seat, and a clamp to handle the blade-bearer socket and comprising two opposed clamping jaws engaging over said socket and having each a ramp surface coordinated with each operating key of the locking device and acting on this key to cause the opening of the locking device during the movement engaging the clamp on the socket.

2. An appliance according to claim 1, wherein said locking jaws comprise two symmetrical plates hinged on one of their ends on said socket and having sloping areas forming the operating keys, the other ends of said plates being interconnected by a spring disposed to urge said locking jaws towards their closed position.

References Cited

UNITED STATES PATENTS

| | | |
|---|---|---|
| 1,449,440 | 3/1923 | Plank. |
| 2,352,232 | 6/1944 | Strauss _____ 146—124 X |
| 2,614,781 | 10/1952 | Engel. |
| 2,894,551 | 7/1959 | Otto _____ 146—68 |

W. GRAYDON ABERCROMBIE, Primary Examiner